(12) United States Patent
Hatfield et al.

(10) Patent No.: US 9,751,168 B2
(45) Date of Patent: Sep. 5, 2017

(54) METHODS AND APPARATUS FOR ASSEMBLING VEHICULAR COMPONENTS

(71) Applicant: Honda Motor Co., Ltd., Tokyo (JP)

(72) Inventors: Bryan Hatfield, Greensburg, IN (US); Victor Greenhut, Waldron, IN (US); Brandon E. Hunter, Rushville, IN (US)

(73) Assignee: HONDA MOTOR CO., LTD., Tokyo (JP)

( * ) Notice: Subject to any disclaimer, the term of this patent is extended or adjusted under 35 U.S.C. 154(b) by 185 days.

(21) Appl. No.: 14/642,598

(22) Filed: Mar. 9, 2015

(65) Prior Publication Data
US 2016/0264197 A1    Sep. 15, 2016

(51) Int. Cl.
*B23P 19/10*    (2006.01)

(52) U.S. Cl.
CPC ........... *B23P 19/10* (2013.01); *B23P 2700/14* (2013.01); *B60G 2206/92* (2013.01)

(58) Field of Classification Search
CPC ....... B62D 65/026; B62D 65/12; B62D 17/00
See application file for complete search history.

(56) References Cited

U.S. PATENT DOCUMENTS

| | | | | |
|---|---|---|---|---|
| 2,772,596 A | * | 12/1956 | Trussell | B62D 17/00 188/196 M |
| 2,978,253 A | * | 4/1961 | Jackman | B62D 17/00 280/86.753 |
| 3,840,211 A | | 10/1974 | Castoe | |
| 4,037,680 A | | 7/1977 | Grove | |
| 4,194,760 A | * | 3/1980 | Shiomi | B60G 15/07 280/86.753 |
| 4,420,170 A | * | 12/1983 | Wysocki | B62D 17/00 280/86.755 |
| 4,619,465 A | | 10/1986 | Johnson | |
| 5,779,260 A | * | 7/1998 | Reilly | B60G 15/07 280/86.754 |
| 6,688,616 B1 | | 2/2004 | Ziech | |
| 6,688,617 B2 | | 2/2004 | Chamberlin | |
| 6,932,366 B2 | | 8/2005 | Jones et al. | |
| 7,475,890 B1 | | 1/2009 | Kern | |
| 8,322,729 B2 | | 12/2012 | Michel et al. | |

FOREIGN PATENT DOCUMENTS

KR    20040015949 A    2/2004

* cited by examiner

*Primary Examiner* — Jacob Cigna
(74) *Attorney, Agent, or Firm* — Kenealy Vaidya LLP

(57) ABSTRACT

An adjustable locator includes an adjuster plate that communicates with an upper section of a damper to affect a relative orientation between the damper and a knuckle during assembly. A guide body is disposed at an opposite side of the adjuster plate from the damper, and a shim is configured for insertion between the adjuster plate and the guide body. Insertion of the shim causes the adjuster plate to change the relative orientation between the damper and the knuckle. A biasing device is configured to bias the guide body toward the damper and thereby fix the shim between the guide body and the adjuster plate, such that applying a force to the guide body that is greater than the biasing force of the spring in a direction opposite to the biasing force of the spring enables the shim to be removed from between the guide body and the adjuster plate.

8 Claims, 5 Drawing Sheets

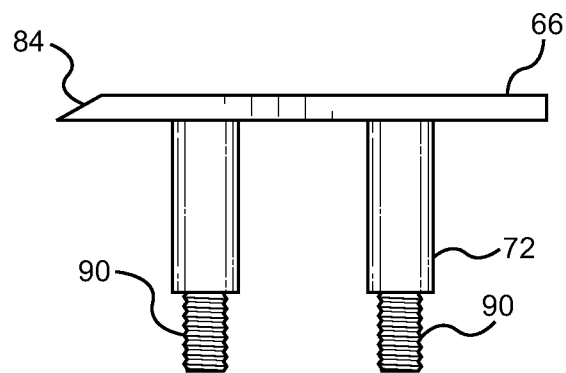
FIG. 6
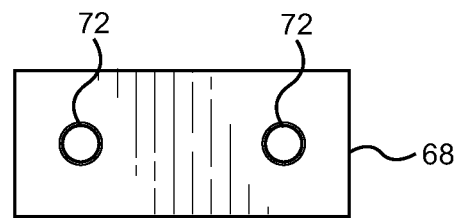
FIG. 7
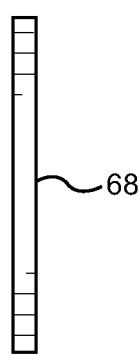 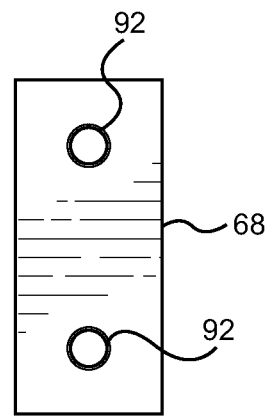
FIG. 8     FIG. 9

METHODS AND APPARATUS FOR ASSEMBLING VEHICULAR COMPONENTS

BACKGROUND

The disclosed subject matter relates to methods and apparatus for assembling at least two vehicular components. More particularly, the disclosed subject matter relates to assembling the vehicular components so as to achieve a predetermined relative orientation.

Various types of tolerances can be relevant to assembly of different vehicular components, including but not limited to components directly or indirectly related to vehicular wheels and/or tires. As one example, a vehicular knuckle, which is directly or indirectly attached to a vehicular brake rotor and/or wheel, can be assembled or otherwise directly or indirectly connected to a vehicular damper. Driveshaft press equipment can be used to assemble or otherwise connect the knuckle to the damper so as to provide a predetermined orientation therebetween.

This orientation or angle defined between the knuckle and damper sets, determines or otherwise impacts the individual and/or cross camber for the respective tire and/or vehicle. Camber can be defined as the angle made by vehicular wheels, and in particular the angle between the vertical axis of the wheels used for steering and the vertical axis of the vehicle when viewed from a front or rear of the vehicle. Positive camber occurs where the top of the wheel extends further in an outwardly direction than the bottom of the wheel, i.e., in a direction away from the vehicular axle. Conversely, negative camber occurs where the bottom of the wheel extends further in the outwardly direction than the top of the wheel.

SUMMARY

Determining the camber affects or is otherwise relevant to the design of vehicular suspension and steering systems, and may affect handling qualities of a particular suspension design, especially in the context of steering suspension components. For example, negative camber may enhance gripping of the road or other surface on which the vehicle travels during cornering, because the negative camber may place the wheel at a beneficial angle relative to the road or other surface, thereby transmitting forces through the vertical plane of the wheel as opposed to transmitting a sheer force across the wheel. Negative camber may also be beneficial where rubber tires are attached to the vehicular wheels, based on the fact that rubber tires tend to roll on themselves while cornering. In the context of an outside rubber tire during a turn, an inside edge of a contact patch of the tire may tend to lift off of the road or other surface if the tire has zero camber, thereby reducing the area of the contact patch. Negative camber may compensate for this effect by increasing the contact patch area. Contrarily, in the context of straight-line acceleration, traction may be enhanced by providing a zero camber angle such that the tire is flat on the road or other surface.

Suspension design therefore typically includes determining a proper or otherwise beneficial camber angle, and may take into account idealized geometric models as well as real-life behavior of the relevant components, such as flex, distortion, elasticity, etc. The desired camber, which is dictated by the relative orientation or angle between the knuckle and damper, may vary depending on various circumstances or contexts. For example, the desired camber may vary between different automobile models, different years of the same automobile model, etc. In addition, during manufacturing or in the context of a newly manufactured vehicle, the actual camber may be different from a desired camber for a number of reasons, such as due to variances caused by manufacturing equipment, including but not limited to the driveshaft press equipment that is used to assemble or otherwise connect the knuckle to the damper.

This discrepancy between actual camber and desired camber may be detected at different stages of the manufacturing process, such as during a final quality review. For example, in accordance with certain manufacturing procedures, a vehicle's wheel alignment may be tested subsequent to assembly. If the vehicle's wheel alignment is unsatisfactory, such as where the magnitude of discrepancy between the actual camber and desired camber exceeds a certain threshold, then the vehicle's knuckle needs to be disengaged from the damper and then re-attached to provide the requisite camber.

Re-assembling the knuckle and damper to provide a different camber may involve relatively complicated and/or time consuming adjustments to the driveshaft press equipment, which may be disadvantageous for various reasons, especially in the context of manufacturing a large number of vehicles. In some cases, this procedure may require use of a new or different jig, and/or adjustments to existing press equipment.

However, adjusting related art press equipment is performed when the equipment is not in use, and thus may require an assembly line to be shut down during installation of a new jig. In some such cases, existing rough guides are removed, shims are added, and then the rough guides are re-installed.

It may therefore be beneficial to provide methods and apparatus that address at least one of the difficulties disclosed above with regard to camber adjustments. For example, it may be beneficial to provide methods and apparatus that enable the reassembly of the knuckle and damper to achieve an adjusted camber on the fly, such as by avoiding, minimizing or reducing an assembly line shut down. Some of these embodiments enable camber adjustments to be performed via a relatively simple, efficient, and/or time efficient manner, which may enhance the flexibility of the press equipment. The disclosed embodiments achieve these and/or other advantages via different methods and apparatus, such as by enabling the adjustment of rough guides (and in some cases via shims) without requiring disassembly (or with reduced disassembly) of the jig.

Some embodiments are therefore directed to an adjustable locator for use with a jig to facilitate assembly of a vehicular damper and a knuckle. The adjustable locator can include an adjuster plate that is configured to communicate with an upper section of the damper to thereby affect a relative orientation between the damper and the knuckle during assembly. A guide body can be disposed at an opposite side of the adjuster plate from the damper. A shim can be configured for insertion between the adjuster plate and the guide body, such that insertion of the shim causes the adjuster plate to change the relative orientation between the damper and the knuckle. A biasing device can be configured to bias the guide body toward the damper and thereby fix the shim between the guide body and the adjuster plate, such that applying a force to the guide body that is greater than the biasing force of the spring in a direction opposite to the biasing force of the spring enables the shim to be removed from between the guide body and the adjuster plate.

Some other embodiments are directed to an apparatus for facilitating assembly of a vehicular damper and a knuckle.

The apparatus can include a jig that communicates with the vehicular damper and knuckle to facilitate assembly thereof, and an adjustable locator for use with the jig to affect a relative orientation of the damper and the knuckle during assembly thereof. The adjustable locator can include an adjuster plate that is configured to communicate with an upper section of the damper to thereby affect a relative orientation between the damper and the knuckle during assembly; a guide body disposed at an opposite side of the adjuster plate from the damper; and a shim configured for insertion between the adjuster plate and the guide body, insertion of the shim causing the adjuster plate to change the relative orientation between the damper and the knuckle. A biasing device can be configured to bias the guide body toward the damper and thereby fix the shim between the guide body and the adjuster plate, such that applying a force to the guide body that is greater than the biasing force of the spring in a direction opposite to the biasing force of the spring enables the shim to be removed from between the guide body and the adjuster plate.

Still other embodiments are directed to a method of facilitating assembly of a vehicular damper and a knuckle. The method can include: utilizing an adjuster plate to communicate with an upper section of the damper to thereby affect a relative orientation between the damper and the knuckle during assembly; disposing a guide body at an opposite side of the adjuster plate from the damper; inserting a shim between the adjuster plate and the guide body so as to cause the adjuster plate to change the relative orientation between the damper and the knuckle; and biasing the guide body toward the damper to thereby fix the shim between the guide body and the adjuster plate, such that applying a force to the guide body that is greater than the biasing force of the spring in a direction opposite to the biasing force of the spring enables the shim to be removed from between the guide body and the adjuster plate.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIG. 6 is a side plan view of an exemplary adjuster plate and bolts of the adjustable locator assembly of FIGS. 2 and 3.

FIG. 7 is a front plan view of the exemplary adjuster plate 66 of FIG. 6.

FIG. 8 is a side plan view of the exemplary stopper plate of the adjustable locator assembly of FIGS. 2 and 3.

FIG. 9 is a rear plan view of the exemplary stopper plate of FIG. 8.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Exemplary Suspension Components for a Vehicular Wheel

Figure 1:
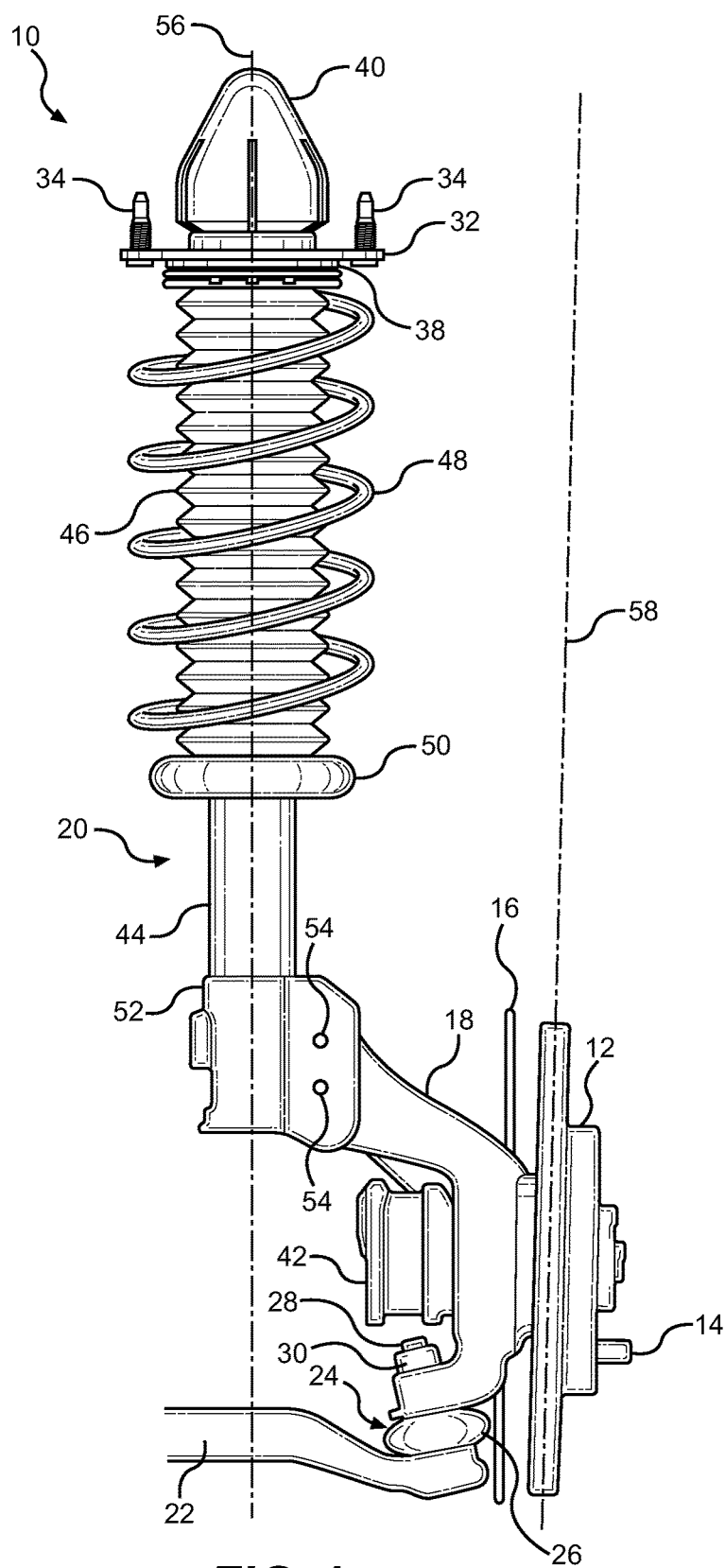
FIG. 1 is a perspective view of exemplary suspension components for a vehicular wheel in accordance with the present disclosure.

FIG. 1 is a perspective view of exemplary suspension components 10 for a vehicular wheel in accordance with the present disclosure. For example, the suspension components 10 can be mounted to a brake rotor 12 that is connected to a vehicular wheel (not shown) via at least one bolt 14. In some embodiments, the vehicular wheel extends around the circumference of the brake rotor 12, and a shield 16 is disposed axially inward of the brake rotor 12, i.e., adjacent a back or rear side of the brake rotor 12. The shield 16 can be configured to provide various functionalities, such as to block or otherwise obstruct debris, including but not limited to mud, water, rocks, etc., from traveling inwardly toward the vehicle, such as toward the suspension components 10.

The suspension components 10 can include a knuckle 18 and a damper 20, which together form a strut. In some embodiments, the strut is attached to sections of the vehicle, including but not limited to vehicular structural components such as elements of the vehicular frame.

For example, as shown in FIG. 1, a lower end of the knuckle 18 can be attached to a vehicular frame member 22 via an attachment assembly 24. The frame member 22 can be a suspension link that is connected to other elements of the vehicular frame. In the embodiment shown in FIG. 1, the suspension link can be characterized as a lower link.

Embodiments are intended to include or otherwise cover any method or apparatus for attaching the knuckle 18 to the frame member 22. In the embodiment shown in FIG. 1, the attachment assembly 24 includes a bushing 26, bolt 28 and nut 30. A head of the bolt 28 can be configured to abut against the frame member 22, and a bolt shaft can extend through an aperture in the frame member 22, the bushing 26, an aperture in the knuckle 18, and ultimately the nut 30, which secures the assembly together. The bushing 26 can be formed of any material, and it may be beneficial to form the bushing 26 from a deformable material, such as rubber, etc., in order to allow a certain or predetermined amount of movement between the frame member 22 and the knuckle 18. In other words, the bushing 26 can be formed of a material so as to act as a shock absorber, and in particular to make the joint between the frame member 22 and the knuckle 18 tight but flexible.

The strut can also be attached to the vehicle at other location(s), such as at a location adjacent an upper end of the damper 20. In the embodiment shown in FIG. 1, the damper 20 is attached to other vehicular structural components (not shown) via a mounting flange 32 and pair of bolt assemblies 34. The upper end of the damper 20 can extend through an aperture in the mounting flange 32. An upper mounting plate 36 and a lower mounting plate 38 can be disposed at opposite sides of the mounting flange 32 to secure the damper 20 to the mounting flange 32, and an end cap 40 can be provided at an opposite side of the upper mounting plate 36 to lock the assembly together.

The strut can also communicate with other elements of the vehicle. For example, a vehicular drive shaft 42 can be supported by bearings housed within the knuckle 18. The drive shaft 42 can extend through an aperture defined in the knuckle 18, and an aperture defined in the brake rotor 12. The drive shaft 42 can be secured at a side of the brake rotor 12 opposite the knuckle 18 to hold the assembly together.

The damper 20 can include a number of separate sub-components. For example, the damper 20 can include an elongated cylinder 44 that extends generally perpendicular to an axis of the drive shaft 42. The cylinder 44 can extend within another outer cylinder (not shown), which itself is disposed within a flexible cover 46. Seals (not shown) may be provided between the cylinder 44 and the outer cylinder, and a piston and fluid may extend within the cylinder 44. A spring 48 may extend along the exterior of the flexible cover 46, and be held in place longitudinally by a shoulder 50 at a bottom end, and another structure at an upper end, such as the lower mounting plate 38. In the embodiment shown in FIG. 1, the spring 48 is shown as a coil spring, however embodiments are intended to include or otherwise cover any other type of spring or similar mechanism.

The elements discussed above cooperate to facilitate the damping operation of the damper 20. However, these elements are merely discussed above for exemplary purposes, and embodiments are intended to include or otherwise cover any type of damper or damping mechanism.

The damper 20 includes a damper flange 52 at its lower end that is configured for attachment to the knuckle 18. Embodiments are intended to include or otherwise cover any methods and apparatus for connecting the damper 20 to the knuckle 18. In the embodiment shown in FIG. 1, the damper flange 52 is connectable to a corresponding knuckle flange (not shown) provided at a top end of the knuckle 18. In some embodiments, the knuckle flange includes a pair of inner attachment flanges that are disposed within and between corresponding outer attachment flanges of the damper flange 52. A pair of apertures 54 can be defined in each of the inner and outer attachment flanges, and bolts can extend through these apertures to secure the damper flange 52 to the knuckle flange, thereby securing the damper 20 and knuckle 18 together. However, as indicated above, any method and apparatus can be used to secure the damper 20 and knuckle 18 together.

In many applications, the strut is assembled, and then attached to the vehicle (such as at the locations discussed above) in the assembled condition. However, embodiments are intended to include or otherwise cover other alternative manufacturing techniques. In either case, the ultimate orientation of components of the strut, such as the relative orientation between the damper 20 and the knuckle 18 (which ultimately impacts the relative orientation between the damper 20 and other vehicular components, such as a line perpendicular to the drive shaft), may be relevant to certain characteristics of the vehicle. For example, as disclosed above, camber may be relevant to the design of vehicular suspension and steering systems, and may affect handling qualities of a particular suspension design, especially in the context of steering suspension components.

The camber may be measured or otherwise determined based on any known, related art or later developed techniques. In some embodiments, the camber is determined by comparing a damper angle line 56, which extends along a direction of elongation of the damper 20 (or components thereof, such as the cylinder 44), to a hub reference line 58, which extends along a vertical diameter of the brake rotor 12 (or perpendicular to the drive shaft 42). No camber would occur if the damper angle line 56 and the hub reference line 58 are parallel. In configurations where either positive or negative camber is defined, the magnitude of the angle determines that amount of camber.

The above suspension components 10 (strut) are merely discussed for exemplary purposes, and embodiments are intended to include or otherwise cover other known, related art, or later developed struts. In fact, some embodiments are directed to orientations of vehicular components that are not related to struts. Still further, some embodiments are directed to orienting components that are unrelated to vehicles.

II. Overall Adjustable Locator Assembly

Figure 2:
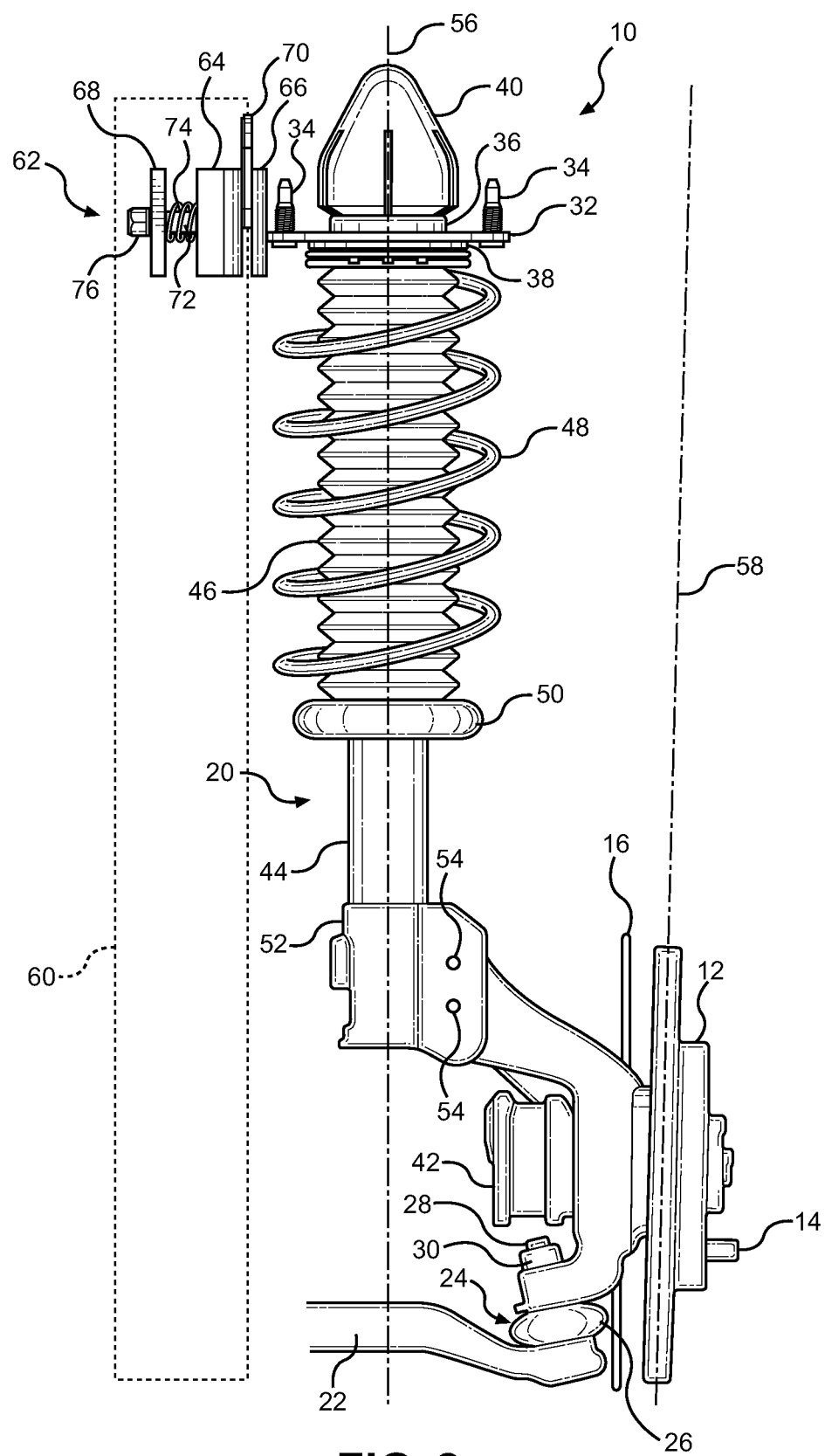
FIG. 2 is a perspective view of the suspension components of FIG. 1 with an exemplary jig and adjustable locator assembly in accordance with the present disclosure.
Figure 3:
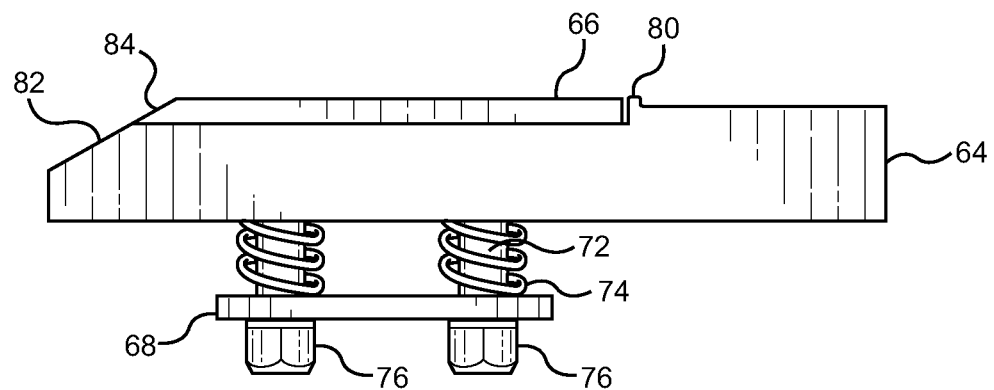
FIG. 3 is an enlarged perspective view of the adjustable locator assembly of FIG. 2.

FIG. 2 is a perspective view of the suspension components of FIG. 1 with an exemplary jig 60 and adjustable locator assembly 62 in accordance with the present disclosure; and FIG. 3 is an enlarged perspective view of the adjustable locator assembly 62 of FIG. 2.

In some embodiments, the jig 60 is fixed, and used to attach the damper 20 to the knuckle 18. The camber (which can be measured as disclosed above) can be dictated based on how the jig 60 is used to attach the damper 20 to the knuckle 18. For example, the adjustable locator assembly 62, which is directed or indirectly connected to the jig 60, can be used to set the camber as the damper 20 is attached to the knuckle 18.

The adjustable locator assembly 62 can include several separate components. For example, a movable plate or adjuster plate 66 can form a distal end of the adjustable locator assembly 62 adjacent the damper 20. In some embodiments, the adjuster plate 66 contacts the mounting flange 32 that is ultimately used to attach an upper section of the damper 20 to the vehicle. As discussed in more detail below, contacting the mounting flange 32 enables the adjuster plate 66, and thereby the adjustable locator assembly 62, to orient the damper 20 relative to the knuckle 18 so as to set the camber.

As shown in FIG. 2, a shim 70 is disposed between a guide body 64 and the adjuster plate 66. As discussed in more detail below, the adjustable locator assembly 62 is configured to enable insertion and removal of the shim 70. For example, the shim 70 can be removed such that the adjustable locator assembly 62 operates without a shim, or alternatively the shim 70 can be replaced with a different shim. Differences in the widths of the alternative shims enable the camber to be set differently. For example, a relatively narrow shim 70 would provide a corresponding camber, while a relatively wide shim 70 would result in a camber that corresponds to the difference in width of the shims. In other words, a relatively narrow shim 70 would cause the damper 20 to be rotated and secured to the knuckle 18 in a counter-clockwise direction relative to FIG. 2, while a relatively wide shim 70 would cause the damper 20 to be rotated and secured in a clockwise direction relative to FIG. 2.

Embodiments are intended to be usable with any type or number of shims 70, or as indicated above without any shim 70 at all. In some embodiments, only a single shim 70 is installed in the adjustable locator assembly 62 at a time, and thus one or more alternative shims of varying widths provide the adjustability disclosed above. Alternatively, in other embodiments, multiple shims 70 can be installed in the adjustable locator assembly 62 at a time. Adjustability can therefore be provided by adding or removing a number of shims to provide the desired camber, and these multiple shims 70 can all share the same width, have different widths, or be a combination thereof.

The adjuster plate 66 includes a pair of bolts 72 that extend from, and in a direction perpendicular to, a surface of the adjuster plate 66 facing away from the damper 20. The bolts can be initially formed separately from the adjuster plate 66 and attached thereto by any known, related art or later developed method or apparatus, such as via welding, or alternatively can be integrally or unitarily formed with the adjuster plate 66. Only a single bolt 72 is shown in the perspective of FIG. 2, but both bolts 72 are shown in FIG. 3. Any number of bolts or other projections can be used.

The bolts 72 are elongated and sized in their directions of elongation to extend along the entire lateral width of the adjustable locator assembly 62. Thus, the bolts 72 extend through apertures in the guide body 64 and traverse the entire lateral width thereof, such that the bolts 72 project from a surface of the guide body 64 that faces away from the damper 20.

A stopper plate 68 is adjacent to, but spaced from, the guide body 64 in a lateral direction away from the damper 20. Thus, the guide body 64 is disposed between the stopper plate 68 and the shim 70. The bolts 72 extend through apertures defined in the stopper plate 68, and are sized to traverse the entire lateral width of the stopper plate 68 so as to project from a surface of the stopper plate 68 facing away from the damper 20. The apertures and diameters of the bolts 72 are sized to that the stopper plate 68 is retained at a predetermined location on the longitudinal length of the bolts 72. The stopper plate 68 is thereby fixed at a predetermined spacing from the adjuster plate 66 from which the bolts 72 extend.

Ends of the bolts 72 that project from the surface of the stopper plate 68 facing away from the damper 20 are threaded to accommodate nuts 76 for insertion thereon. For example, the nuts 76 can be screwed onto the threaded ends of the bolts 72 to secure the stopper plate 68 at the predetermined location disclosed above.

A spring 74 is disposed coaxially along each of the bolts 72, and extends between the guide body 64 and the stopper plate 68. In the embodiment shown in FIGS. 2 and 3, the springs 74 are shown as coil springs, however embodiments are intended to include or otherwise cover any type of springs or other apparatus that performs the operation disclosed above.

The springs 74 are configured and disposed so as to provide a tension force between the stopper plate 68 and the guide body 64. As disclosed above, the stopper plate 68 is fixed on the bolts 72, and is thereby immobile relative to the adjuster plate 66. Because the stopper plate 68 is immobile relative to the adjuster plate 66, the tension force of the springs 74 applies a force to the guide body 64 urging the guide body 64 toward the damper 20. Thus, the springs 74 force the guide body 64 into contact with the shim 70, and the shim 70 into contact with the adjuster plate 66. The springs 74 thereby maintain the shim 70 in contact with the adjuster plate 66 on one side and the guide body 64 on the opposite side.

The adjustable locator assembly 62 thereby enables shims 70 to be inserted and held in place between the adjuster plate 66 and the guide body 64, and the shims 70 can also be removed from this location. Addition and removal of the shims 70 enables the relative orientations of the damper 20 and the knuckle 18 to be adjusted, without detaching the adjustable locator assembly 62 from the jig 60 or performing other adjustments to the jig 60.

In other words, the insertability and removability of the shims 70 enables the camber to be adjusted on the fly, and thereby avoids, minimizes or reduces an assembly line shut down. Camber adjustments can thereby be performed via a relatively simple, efficient, and/or time efficient manner, which may enhance the flexibility of the press equipment.

The elements are disclosed above for exemplary purposes, and embodiments are intended to include or otherwise cover other configurations. For example, any number of bolts 72 (including a single bolt 72) can be used to maintain the stopper plate 68 at a fixed spacing from the adjuster plate 66. In fact, embodiments are intended to include any structure for holding the stopper plate 68 in place at a sufficient distance from the adjuster plate 66.

In addition, all of the embodiments do not necessarily include springs 74 disposed between the stopper plate 68 and the guide body 64. For example, embodiments are intended to include or otherwise cover any methods or apparatus for urging the guide body 64 toward the damper 20 and thus into contact with the shim 70, and the shim 70 into contact with the adjuster plate 66.

Embodiments are intended to cover still other modifications to the exemplary embodiment shown in FIGS. 2 and 3, and/or to the elements disclosed above. For example, some embodiments do not include the stopper plate 68. In some of these embodiments, the springs 74 extend coaxially along the bolts 72 between the nuts 76 and the guide body 64. In other words, in these embodiments, the nuts 76 perform the function of the stopper plate 68.

However, the modifications are disclosed above for exemplary purposes, and embodiments are intended to cover other alternative structures.

III. Adjustable Locator Assembly Components

A. Guide Body

Figure 4:
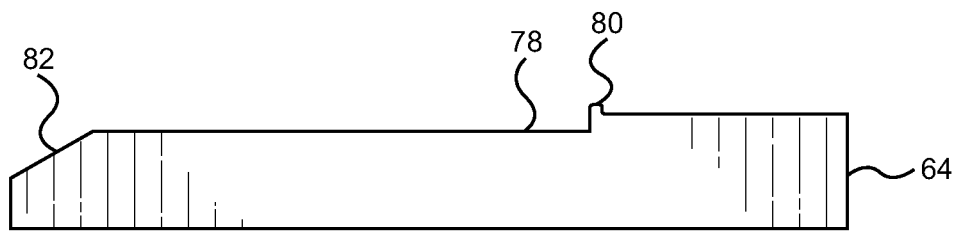
FIG. 4 is a side plan view of an exemplary guide body of the adjustable locator assembly of FIGS. 2 and 3.
Figure 5:
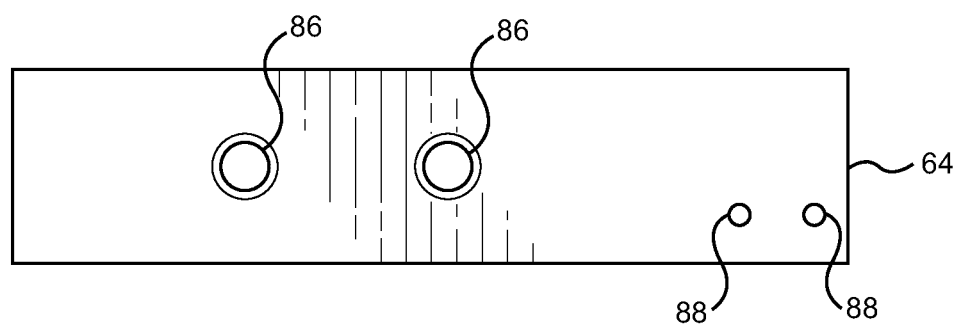
FIG. 5 is a front plan view of the exemplary guide body of the adjustable locator assembly of FIGS. 2 and 3.

FIG. 4 is a side plan view of an exemplary guide body 64 of the adjustable locator assembly 62 of FIGS. 2 and 3; and FIG. 5 is a front plan view of this exemplary guide body 64.

As shown in FIGS. 3 and 4, the surface of the guide body 64 facing the damper 20, which is adjacent the shim 70 and adjuster plate 66, defines a recessed portion 78. The recessed portion 78 is bounded at one end by a flange 80, and is unbounded at the opposite end such that the surface forming the recessed portion 78 is generally L-shaped. An end of the guide body 64 adjacent the unbounded end of the recessed portion 78 includes a tapered portion 82.

The recessed portion 78 and the flange 80 are configured to accept the shim 70, and/or the adjuster plate 66 in lieu of the shim 70. For example, FIG. 3 shows the adjustable locator assembly 62 without the shim 70, such that an exterior surface of the adjuster plate 66 follows the contours of the recessed portion 78 and the flange 80. In fact, an end of the adjuster plate 66 can include a second tapered portion 84 that corresponds to the tapered portion 82 of the guide body 64. In other words, an inclined surface of the second tapered portion 84 is parallel with, and is collinear with, a corresponding inclined surface of the tapered portion 82 of the guide body 64 when the adjuster plate 66 is disposed within the recessed portion 78.

As shown in FIG. 5, the guide body 64 defines two bolt receiving holes 86, which are disposed and configured to correspond to the bolts 72 that project from the adjuster plate 66. The bolts 72 extend through the bolt receiving holes 86, from one lateral side of the guide body 64 to the other, which serves to fix the orientation of the guide body 64 relative to the adjuster plate 66. In other words, the bolts 72 enable the lateral spacing between the adjuster plate 66 and guide body to be adjusted, i.e., toward and away from the damper 20. However, the bolts 72 impede or prevent adjusting the spacing between these elements in other directions, such as in a direction parallel to the direction of elongation of the damper 20, i.e., the longitudinal direction.

In some embodiments, the bolt receiving holes 86 are sized to fit snugly around circumferential exterior surfaces of the bolts 72. The snug fitting further impedes or prevents adjustments in the spacing between these elements in the directions indicated above, such as in the longitudinal direction.

The guide body 64 can include other features that may be beneficial. For example, the guide body 64 can include a pair of mounting holes 88 that facilitate mounting the guide body 64 to another element, such as the jig 60. The mounting holes 88 can be disposed and configured to enable mounting bolts or other fasteners to extend therethrough and thereby secure, either directly or indirectly, the guide body 64 to the jig 60. However, embodiments are intended to include or otherwise cover any methods or apparatus for attaching the guide body 64 to the jig 60. In fact, in some embodiments, the guide body 64 is not secured to the jig 60 and is instead secured to another element. Still further, in other embodiments, the guide body 64 is not secured to the jig 60, and instead another element of the adjustable locator assembly 62 is secured to the jig 60 and/or to another stabilizing member.

Figure 12:
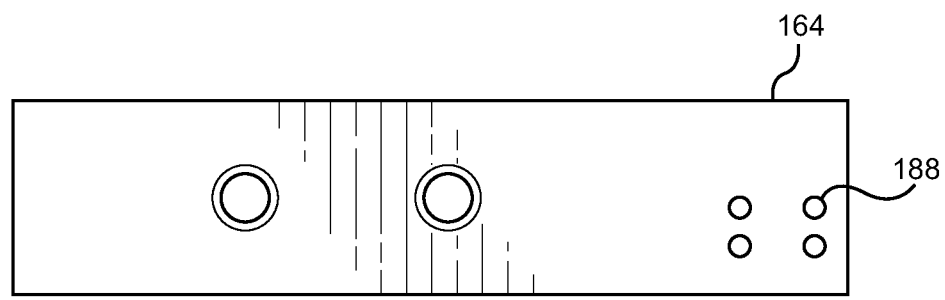
FIG. 12 is a front plan view of an alternative exemplary guide body of the adjustable locator assembly of FIGS. 2 and 3.

FIG. 12 is a front plan view of an alternative exemplary guide body 164 of the adjustable locator assembly of FIGS. 2 and 3. As shown in FIG. 12, the alternative guide body 164 includes four mounting holes 188, instead of the two mounting holes 88 of the embodiment shown in FIG. 5.

Similarly with the guide body 64 of FIG. 5, the four mounting holes 188 of the alternative guide body 164 can be disposed and configured to enable mounting bolts or other fasteners to extend therethrough and thereby secure, either directly or indirectly, the guide body 164 to the jig 60. In other words, four separate fasteners can extend through the four mounting holes 188 to secure the guide body 164 to the jig 60. However, not all of the mounting holes 188 need to be used, and in some embodiments, only one, two or three of the mounting holes 188 are used to secure the guide body 164 to the jig 60.

B. Adjuster Plate

FIG. 6 is a side plan view of an exemplary adjuster plate 66 and bolts 72 of the adjustable locator assembly of FIGS. 2 and 3; and FIG. 7 is a front plan view of the exemplary adjuster plate 66 of FIG. 6. As shown in FIGS. 6 and 7, the bolts 72 extend from a surface of the adjuster plate 66 facing away from the damper 20, in a direction substantially perpendicular to that surface. This surface, from which the bolts 72 extend, is otherwise planar.

The end portions of the bolts 72 that are spaced from the adjuster plate 66 are threaded and thereby define threaded end portions 90. The threaded end portions 90 extend a sufficient distance along the longitudinal length of the bolts 72, and are otherwise configured and disposed, so as to communicate with the nuts 76 (shown in FIGS. 2 and 3).

The diameter of each of the threaded end portions 90 is smaller than a diameter of each of the non-threaded adjacent sections of the bolts 72 so as to retain the stopper plate 68. For example, the diameter of each of the threaded end portions 90 is sufficiently small so as to extend through apertures 92 defined in the stopper plate 68. However, the diameter of each of the non-threaded adjacent sections of the bolts 72 is too large to extend through the apertures 92 of the stopper plate 68, and thus the stopper plate 68 is held on the bolts 72 at a location of the threaded end portions 90 that is closest to the damper 20. In other words, the stopper plate 68 is secured at a location of the bolts 72 where the threaded end portions 90 meet the non-threaded adjacent sections.

C. Stopper Plate

FIG. 8 is a side plan view of the exemplary stopper plate 68, and FIG. 9 is a rear plan view of the exemplary stopper plate 68 of FIG. 8. As shown in FIGS. 8 and 9, the stopper plate 68 is rectangular in cross-section, and defines the two apertures 92 that are disposed and configured to enable the threaded end portions 90 to pass therethrough. The stopper plate 68 is locked in place by nuts 76 that communicate with the threaded end portions 90 and abut a surface of the stopper plate 68 that is furthest from the damper 20.

The stopper plate 68 is configured and disposed to enable the springs 74 to be held in place around the bolts 72, such that each of the springs 74 is coaxial with one of the bolts 72. For example, one end of each of the springs 74 abuts a surface of the stopper plate 68, while an opposite end of each of the springs 74 abuts a facing surface of the guide body 64. The springs 74 thereby apply a compressing force to the guide body 64 to thereby bias or otherwise push the guide body toward the damper 20, and in particular into contact with the shim 70 or the adjuster plate 66 (in lieu of the shim 70). Importantly, insertion and removal of the shims 70 is facilitated by the user's ability to move the guide body 64 against the compressive force of the springs 74, to thereby increase the amount of space available between the guide body 64 and the adjuster plate 66.

D. Shim

Figure 10:
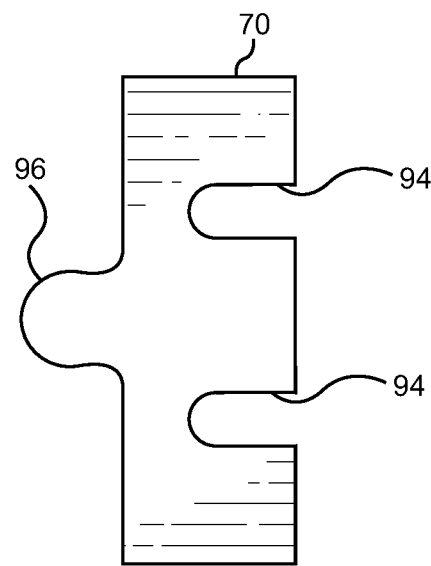
FIG. 10 is a front plan view of an exemplary shim of the adjustable locator assembly of FIG. 3.

FIG. 10 is a front plan view of an exemplary shim 70 of the adjustable locator assembly 62 of FIG. 3. As disclosed above, the shim 70 can be disposed between the guide body 64 and the adjuster plate 66. Placement of the shim 70 enables the camber to be adjusted, and in particular the relative orientation between the damper 20 and the knuckle 18. The use of multiple shims 70 or shims 70 having different thicknesses facilitates further adjustments of the camber.

As shown in FIG. 10, the shim 70 can include a pair of channels 94. An interior end of each of the channels 94 is arcuate, and the channels 94 are open at each of their opposite ends. The channels 94 are each thereby defined by U-shaped surfaces of the shim 70. The channels 94 are configured and disposed to enable the bolts 72 to extend therethrough. The open ends of the channels 94 enable the shim 70 to be moved parallel to the direction of extension of the channels 94 and away from the arcuate ends, i.e., away from the bolts 72. The open ends of the channels 94 thereby enable the shim 70 to be removed from the adjustable locator assembly 62.

The shim 70 can also include a tab 96 disposed at an opposite side of the shim 70 from the open ends of the channels 94. The tab 96 can be disposed at approximately a longitudinal midpoint of the shim 70 and otherwise configured to facilitate manual insertion and/or removal of the shim 70 from the adjustable locator assembly 62. In other words, the tab 96 is configured to enable a user to grasp the tab 96, and thereby manually move or otherwise orient the tab 96 to be inserted in, or removed from, the adjustable locator assembly 62. Insertion and removal of the shims 70 is facilitated by the user's ability to move the guide body 64 against the compressive force of the springs 74, to thereby increase the amount of space available between the guide body 64 and the adjuster plate 66.

Figure 11:
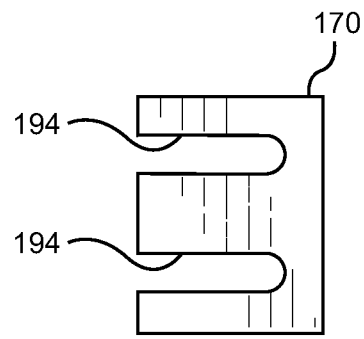
FIG. 11 is a plan view of an alternative exemplary shim of the adjustable locator assembly of FIG. 3.

FIG. 11 is a plan view of an alternative exemplary shim 170 of the adjustable locator assembly 62 of FIG. 3. The alternative shim 170 of FIG. 11 includes a pair of channels 194, which are similar to the channels 94 of the shim 70 of FIG. 10. For example, an interior end of each of the channels 194 is arcuate, and the channels 194 are open at each of their opposite ends. The channels 194 are also configured and disposed to enable the bolts 72 to extend therethrough, and the open ends of the channels 194 enable the alternative shim 170 to be moved parallel to the direction of extension of the channels 194 and away from the arcuate ends, i.e., away from the bolts 72.

However, the channels 194 of the alternative shim 170 are longer than the channels 94 of the shim 70 of FIG. 10. The longer channels 194 thereby enable the alternative shim 170 to be placed at more locations along the bolts 72. The alternative shim 170 also does not include a separate tab 96. Instead, the alternative shim 170 can be manipulated by being manually grasped at a location adjacent an end opposite from the open end of the channels 194, such as at a location between the channels 194.

Embodiments are intended to include or otherwise cover any other type of shim that enables the above operations to be performed, i.e., facilitates camber adjustments. For example, any type of shim can be used that is configured for insertion between the adjuster plate 66 and the guide body 64.

IV. Alternative Embodiments

While certain embodiments of the invention are described above, and FIGS. 1-12 disclose the best mode for practicing the various inventive aspects, it should be understood that the invention can be embodied and configured in many different ways without departing from the spirit and scope of the invention.

As indicated above, some of the embodiments are directed to methods and apparatus for orientating a damper and a knuckle to form a strut so as to facilitate adjusting camber. However, the disclosed methods and apparatus can be used to orient any components for any purpose beyond struts and even beyond vehicular applications.

Some of the embodiments are directed to an adjustable locator assembly 62 that includes various sub-components, including an adjuster plate with projecting bolts, springs extending around and coaxial with the bolts, a guide body, a shim disposed between the adjuster plate and the guide body, and a stopper plate. However, embodiments are intended to include or otherwise cover adjustable locator assemblies that include additional or completely different components, but that otherwise facilitate changing the relative orientations between the damper and knuckle when they are being connected together.

Embodiments are also intended to include or otherwise cover methods of using and methods of manufacturing any or all of the elements disclosed above. Various aspects of these methods can be performed with or otherwise cover processors and computer programs implemented by processors.

While the subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:

1. An adjustable locator for use with a jig to facilitate assembly of a vehicular damper and a knuckle, the adjustable locator comprising:
    an adjuster plate configured to locate an upper section of the damper relative to each of the jig and the knuckle during assembly;
    a guide body disposed at an opposite side of the adjuster plate from the damper;
    a shim configured for insertion between the adjuster plate and the guide body, insertion of the shim causing the adjuster plate to change the relative orientation between the damper and the knuckle;
    a biasing device configured to apply a biasing force to the guide body that biases the guide body toward the damper and thereby fix the shim between the guide body and the adjuster plate, such that applying a force to the guide body that is greater than the biasing force of the biasing device in a direction opposite to the biasing force of the biasing device enables the shim to be removed from between the guide body and the adjuster plate; and
    a stopper plate, wherein
    the adjuster plate includes at least one bolt extending from a surface of the adjuster plate facing away from the damper,
    the guide body defines at least one hole that is disposed and configured for the at least one bolt to extend therethrough,
    the stopper plate defines at least one aperture that is disposed and configured for the at least one bolt to extend therethrough, the stopper plate being spaced from the guide body in a longitudinal direction of the at least one bolt and facing a surface of the guide body that faces away from the damper,
    the biasing device includes at least one spring that is disposed around and coaxial with the at least one bolt, the at least one spring being disposed between a surface of the stopper plate facing the damper and the surface of the guide body facing away from the damper,
    the at least one bolt includes a threaded end portion that projects from the stopper plate in a direction away from the damper, and
    the threaded end portion of the at least one bolt defines a diameter that is smaller than a diameter of a non-threaded adjacent section of the bolt, the diameter of the threaded end portion being sufficiently small to extend through the at least one aperture of the stopper plate, while the diameter of the non-threaded adjacent section of the bolt being larger than a diameter of the at least one aperture of the stopper plate.

2. The adjustable locator according to claim 1, further including a nut that is configured to communicate with the threaded end portion of the at least one bolt and to abut a surface of the stopper plate that faces away from the damper so as to secure the stopper plate at a specified distance from the guide body in the longitudinal direction of the at least one bolt.

3. The adjustable locator according to claim 1, wherein the shim defines at least one channel that includes an arcuate end, the at least one channel being open at an end that is opposite the arcuate end, such that the at least one channel is defined by an U-shaped surface.

4. The adjustable locator according to claim 3, wherein the at least one channel is configured and disposed to enable the at least one bolt to extend therethrough, with the open end facilitating insertion and removal of the shim from between the adjuster plate and the guide body in a direction substantially perpendicular to a longitudinal direction of the at least one bolt.

5. An apparatus for facilitating assembly of a vehicular damper and a knuckle, the apparatus comprising:
- a jig configured to support and locate the vehicular damper relative to the knuckle to facilitate assembly thereof; and
- an adjustable locator connected to the jig, the adjustable locator including:
  - an adjuster plate that is configured to locate an upper section of the damper relative to each of the jig and the knuckle during assembly;
  - a guide body disposed at an opposite side of the adjuster plate from the damper;
  - a shim configured for insertion between the adjuster plate and the guide body, insertion of the shim causing the adjuster plate to change the relative orientation between the damper and the knuckle;
  - a biasing device configured to apply a biasing force to the guide body that biases the guide body toward the damper and thereby fix the shim between the guide body and the adjuster plate, such that applying a force to the guide body that is greater than the biasing force of the biasing device in a direction opposite to the biasing force of the biasing device enables the shim to be removed from between the guide body and the adjuster plate; and
  - a stopper plate, wherein
the adjuster plate includes at least one bolt extending from a surface of the adjuster plate facing away from the damper,
the guide body defines at least one hole that is disposed and configured for the at least one bolt to extend therethrough,
the stopper plate defines at least one aperture that is disposed and configured for the at least one bolt to extend therethrough, the stopper plate being spaced from the guide body in a longitudinal direction of the at least one bolt and facing a surface of the guide body that faces away from the damper,
the biasing device includes at least one spring that is disposed around and coaxial with the at least one bolt, the at least one spring being disposed between a surface of the stopper plate facing the damper and the surface of the guide body facing away from the damper, and the at least one bolt includes a threaded end portion that projects from the stopper plate in a direction away from the damper, and
the threaded end portion of the at least one bolt defines a diameter that is smaller than a diameter of a non-threaded adjacent section of the bolt, the diameter of the threaded end portion being sufficiently small to extend through the at least one aperture of the stopper plate, while the diameter of the non-threaded adjacent section of the bolt being larger than a diameter of the at least one aperture of the stopper plate.

6. The apparatus according to claim 5, further including a nut that is configured to communicate with the threaded end portion of the at least one bolt and to abut a surface of the stopper plate that faces away from the damper so as to secure the stopper plate at a specified distance from the guide body in the longitudinal direction of the at least one bolt.

7. The apparatus according to claim 5, wherein the shim defines at least one channel that includes an arcuate end, the at least one channel being open at an end that is opposite the arcuate end, such that the at least one channel is defined by a U-shaped surface.

8. The apparatus according to claim 7, wherein the at least one channel is configured and disposed to enable the at least one bolt to extend therethrough, with the open end facilitating insertion and removal of the shim from between the adjuster plate and the guide body in a direction substantially perpendicular to a longitudinal direction of the at least one bolt.

* * * * *